United States Patent
Hong et al.

(10) Patent No.: US 8,020,394 B2
(45) Date of Patent: Sep. 20, 2011

(54) AIR CONDITIONER AND CONTROL METHOD THEREOF

(75) Inventors: Jong Ho Hong, Seoul (KR); Nam Soo Lee, Seoul (KR); Shin Jeong Kang, Seoul (KR); Gyu Sang Choe, Gunpo-si (KR)

(73) Assignee: LG Electronics Inc., Seoul (KR)

(*) Notice: Subject to any disclaimer, the term of this patent is extended or adjusted under 35 U.S.C. 154(b) by 582 days.

(21) Appl. No.: 11/676,710

(22) Filed: Feb. 20, 2007

(65) Prior Publication Data
US 2008/0000245 A1    Jan. 3, 2008

(30) Foreign Application Priority Data
Feb. 17, 2006 (KR) .................. 10-2006-0015656

(51) Int. Cl.
*F25B 41/04* (2006.01)
*F25B 47/00* (2006.01)
*F25B 13/00* (2006.01)
*F25D 21/00* (2006.01)

(52) U.S. Cl. ........... 62/222; 62/84; 62/150; 62/160; 62/468

(58) Field of Classification Search .......... 62/222, 62/160, 150, 84, 468
See application file for complete search history.

(56) References Cited

U.S. PATENT DOCUMENTS

| | | | | |
|---|---|---|---|---|
| 4,620,424 A | * | 11/1986 | Tanaka et al. | 62/222 |
| 4,932,215 A | * | 6/1990 | Kanazawa et al. | 62/84 |
| 5,501,201 A | * | 3/1996 | Miyoshi et al. | 123/568.24 |
| 5,551,248 A | * | 9/1996 | Derosier | 62/155 |
| 5,876,014 A | * | 3/1999 | Noritake et al. | 251/129.12 |
| 6,886,354 B2 | * | 5/2005 | Dudley | 62/193 |
| 2002/0129612 A1 | * | 9/2002 | Saikusa et al. | 62/192 |

FOREIGN PATENT DOCUMENTS

| | | | |
|---|---|---|---|
| JP | 4139358 A | | 5/1992 |
| JP | 05-099517 | * | 4/1993 |
| JP | 410197103 A | * | 7/1998 |

OTHER PUBLICATIONS

Japanese Office Action dated Apr. 3, 2009 for Application No. 2007-036840, 2 pages.

* cited by examiner

*Primary Examiner* — Ljiljana Ciric
*Assistant Examiner* — Travis Ruby
(74) *Attorney, Agent, or Firm* — Fish & Richardson P.C.

(57) ABSTRACT

Disclosed here is an air conditioner and the control method thereof comprising an outdoor unit having an outdoor heat exchanger for the heat exchanging of the outdoor air and refrigerant; at least one indoor unit corresponding to the outdoor unit and having indoor heat exchanger for the heat exchanging of the room air and refrigerant; an expansion valve installed on the refrigerant pipe connecting the outdoor heat exchanger and the indoor heat exchanger, and expanding the refrigerant; and a control device controlling the opening speed of the expansion valve in accordance with the operation modes of the indoor unit.

18 Claims, 5 Drawing Sheets

AIR CONDITIONER AND CONTROL METHOD THEREOF

This application claims the benefit of Korean Application No. 10-2006-0015656 filed on Feb. 17, 2006, which is hereby incorporated by references in its entirety.

BACKGROUND

1. Technical Field

This document relates to an air conditioner. For example, this document relates to an air conditioner and the control method thereof capable of reducing noise.

2. Discussion of the Related Art

In general, an air conditioner is an apparatus for cooling and/or heating an indoor space by the processes of compressing, condensing, expanding and evaporating refrigerant.

The air conditioner comprises an outdoor unit and an indoor unit connected to the outdoor unit. Air conditioners are classified into a general type air conditioner having one indoor unit connected to one outdoor unit, and a multi-type air conditioner having a multitude of indoor units connected to one outdoor unit.

Alternatively, air conditioners are classified into a cooling system supplying only cool air into the indoor space by operating the refrigerant cycle only in one way, and a cooling and heating system supplying cool or warm air into the indoor space by operating the refrigerant cycle in both ways optionally.

An air conditioner is basically forming a refrigerating cycle including a compressor, an outdoor heat exchanger, an expansion valve and an indoor heat exchanger.

The gaseous refrigerant compressed at the compressor is turned into liquid after flowing into the outdoor heat exchanger. The refrigerant radiates heat to outside as it is turned into liquid at the outdoor heat exchanger. After that, the refrigerant discharged from the outdoor heat exchanger is expanded when passing through the expansion valve and is flowed into the indoor heat exchanger.

The liquid refrigerant flowed into the indoor heat exchanger is turned into gaseous refrigerant. The refrigerant absorbs the outer heat as being phase-changed at the indoor heat exchanger.

The air conditioner generally has a cooling/heating operation mode to cool and heat the indoor space, a defrost operation mode to remove frost generated by the cooling/heating operation of the air conditioner, and an oil recovery operation mode to recover oil flowing with the refrigerant.

The opening degree of the expansion valve is predetermined to a fixed value for the cooling/heating mode, the oil-recovery operation mode, and the defrost operation mode. That is, the expansion valve of the conventional air conditioner maintains a predetermined opening degree regardless of the operation modes of the air conditioner.

As the blowing noise and operation noise generated during the cooling/heating mode of the air conditioner are familiar to human ears, the users don't react to the noises sensitively.

On the other hand, the refrigerant flowing noise generated during the oil recovery operation mode and defrost operation mode of the air conditioner has frequencies harsh to human ears. Especially, the flowing noise due to the flowing of the refrigerant is increased at the spot passing through the expansion valve.

The graph illustrated in FIG. 1 indicates the noise generated during the oil recovery operation mode and defrost operation mode of an air conditioner.

There are two peak values P10, P20 for the flowing noise generated at the early stage of the operation during the oil recovery operation mode and the defrost operation mode. The frequencies at the peak values are the frequencies harsh to human ears, and thus the noise is heard sensitively to the users.

The noise due to the flowing of the refrigerant has become the main complaint from consumers, and it has caused the deterioration of the reliability of the product.

It is possible to install a noise-reducing device such as a muffler or a strainer at around the expansion valve to reduce the flowing noise. However, such additional installation of the noise-reducing device increases the installing cost of the air conditioner.

SUMMARY

In one general aspect, an improved air conditioner and a method of controlling an air conditioner overcome the above-mentioned conventional problems and reduce the flowing noise of the refrigerant.

In another general aspect, an improved air conditioner and a control method reduce costs required to reduce the flowing noise of the refrigerant.

To these ends, an air conditioner includes an outdoor heat exchanger configured to exchange heat between outdoor air and a refrigerant, an indoor heat exchanger configured to exchange heat between room air and the refrigerant, an expansion valve provided between the outdoor heat exchanger and the indoor heat exchanger and configured to expand the refrigerant, and a control device configured to control opening speed of the expansion valve in accordance with operation modes of the air conditioner.

The air conditioner may further include a signal-generating device generating control signals to control the opening speed of the expansion valve.

The operation modes of the air conditioner may include a cooling/heating operation mode to cool and warm the indoor space, a defrost operation mode to remove frost generated due to operation of the air conditioner, and an oil recovery operation mode to recover the oil circulated during the operation of air conditioner.

The opening speed of the expansion valve at one of the above-mentioned operation modes can be different from the opening speed of the expansion valve at another of the above-mentioned operation modes.

The opening speed of the expansion valve may change while the air conditioner is operated at a certain operation mode.

The opening speed of the expansion valve at the cooling/heating operation mode can be faster than the opening speed of the expansion valve at the oil recovery operation mode or the defrost operation mode.

The expansion may be opened by a stepping motor and the control signal applied to the stepping motor may have the PPS (Pulse Per Second) value of between 100 PPS to 140 PPS during the oil recovery operation mode.

The air conditioner may further include a measuring sensor to gather information to determine the operation mode of the air conditioner.

In another general aspect, a method of controlling an air conditioner includes determining an operation mode of the air conditioner, and controlling an opening speed of an expansion valve, which is configured to expand a refrigerant of the air conditioner, in accordance with the determined operation mode.

The control method may further include generating the control signals to control the opening speed of the expansion valve.

The operation mode can be decided among the cooling/heating operation mode, the defrost operation mode, and the oil recovery operation mode.

The opening speed of the expansion valve can be controlled differently between two of the operation modes.

The opening speed of the expansion valve can be controlled to changed during a certain operation mode.

The opening speed of the expansion valve at the cooling/heating operation can be controlled to be faster than the opening speed of the expansion valve at the oil recovery operation mode or the defrost operation mode.

The operation mode of the air conditioner may be determined by a sensor measurement value.

The operation mode of the air conditioner may be determined by comparing the sensor measurement value with a predetermined value.

The operation mode may be changed if the air conditioner is operated at a certain operation mode for a predetermined period.

Other features will be apparent from the following description, including the drawings, and the claims.

DETAILED DESCRIPTION

Figure 1:
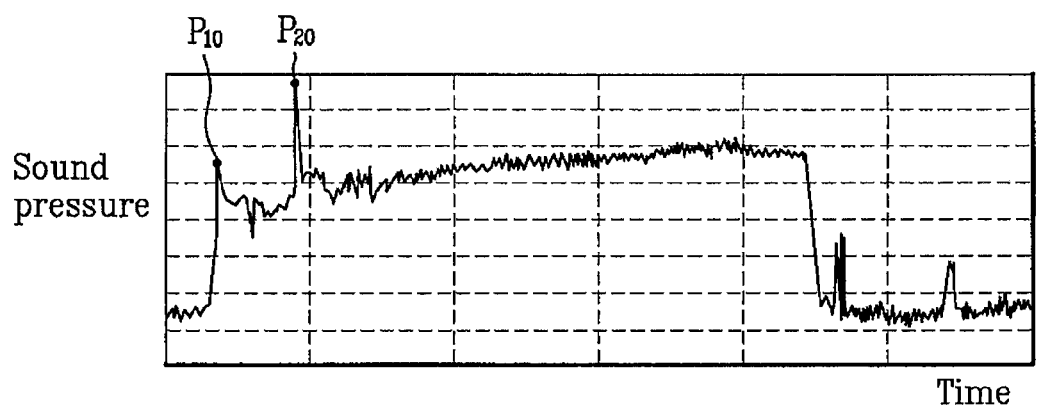
FIG. 1 is a graph indicating the noise generated from a conventional air conditioner.
Figure 2:
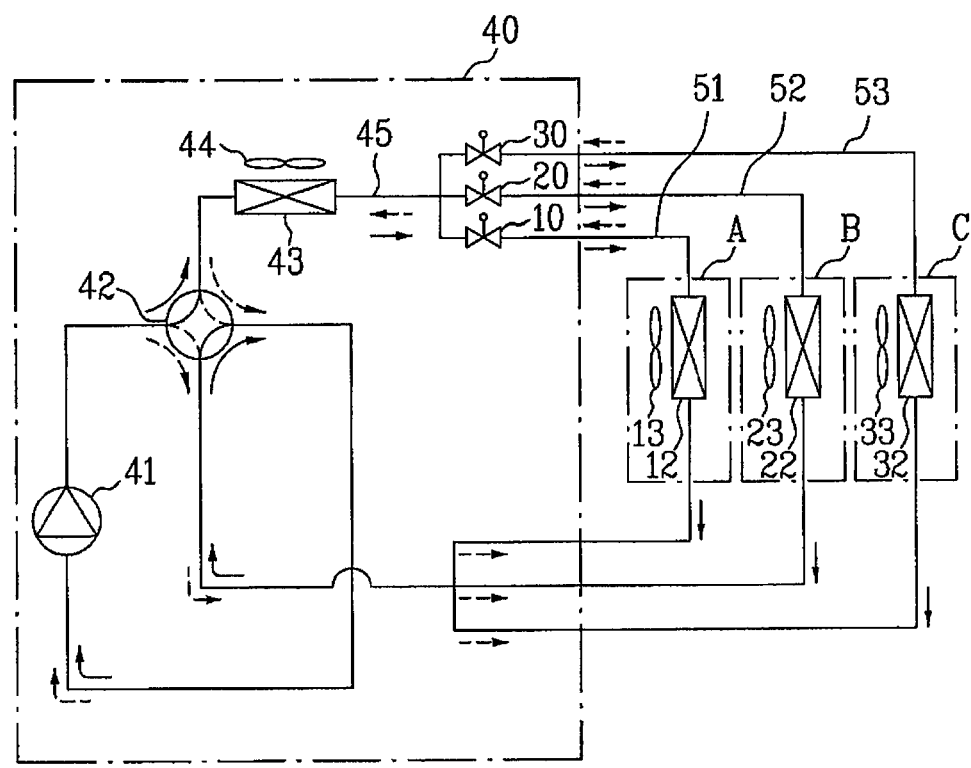
FIG. 2 is a schematic diagram of an air conditioner.

Referring to FIG. 2, an air conditioner comprises an outdoor unit 40, at least one indoor unit A, B and C corresponding to the outdoor unit, and at least one refrigerant pipe 51, 52 and 53 connecting the indoor unit with the outdoor unit.

Each of the indoor units in the chamber A, chamber B and chamber C is connected with one outdoor unit 40 through each of the first refrigerant pipe 51, the second refrigerant pipe 52 and the third refrigerant pipe 53. The indoor units can be operated under the cooling/heating operation mode at the same time, or some can be operated under the air-cooling operation and the others are operated under the heating operation mode.

A compressor 41 compressing the refrigerant with high temperature and high pressure is installed at the outdoor unit 40, and the compressor 41 is connected with a 4-way valve 42 changing the flow of the refrigerant compressed with high temperature and high pressure. The 4-way valve 42 changes the flow of the refrigerant in accordance with the operating conditions (cooling or heating) of the air conditioner.

The 4-way valve 42 is connected with the outdoor heat exchanger 43 heat exchanging the refrigerant compressed with high temperature and high pressure and outdoor air. An outdoor blowing fan 44 is installed around the outdoor heat exchanger 43 for efficient heat exchange between the refrigerant and outdoor air. The outdoor blowing fan 44 blows the outdoor air into the outdoor heat exchanger 43.

The outdoor heat exchanger 43 is connected with the expansion valves 10, 20 and 30, each of which controls the temperature of the refrigerant. In the illustrated implementation, the outdoor heat exchanger 43 is connected with the expansion valves 10, 20 and 30 through the main refrigerant pipe 45. Further, the main refrigerant pipe 45 is branched out to the first refrigerant pipe 51, the second refrigerant pipe 52 and the third refrigerant pipe 53 connected to each of the indoor units.

The expansion valves 10, 20 and 30 control the distribution and flow of the refrigerant to cool/heat each of the inner spaces in accordance with the operation condition of each indoor unit A, B and C.

The expansion valves 10, 20 and 30 are controlled by the control device (not illustrated) of the air conditioner, and expand the refrigerant heat-exchanged in the outdoor heat exchanger 43.

Further, the expansion valves 10, 20 and 30 are controlled differently in accordance with the operation modes. In the illustrated implementation, the opening degree and the opening speed are different when the air conditioner is operated with the cooling/heating operation mode to cool and heat the indoor space, when the air conditioner is operated with the defrost operation mode to remove the frost generated by operating the indoor unit, and when the air conditioner is operated with the oil recovery operation mode to recover the oil circulated during the operation of the indoor unit.

For instance, the opening speed of the expansion valves 10, 20 and 30 while the air conditioner is operated with the cooling/heating operation mode can be established to be faster than the opening speed of the expansion valve while the air conditioner is operated with the oil recovery operation mode and defrost operation mode.

The opening degree, opening speed, and other factors may be different for each of the operation modes. For example, the opening speed and opening degree of the expansion valve at one operating mode are different from those at another operation mode.

Indoor heat exchangers 12, 22 and 32 are installed at the indoor units A, B and C for heat exchanging between the refrigerant passed through the expansion valves 10, 20 and 30 and room air during the cooling operation. Further, inner blowing fans 13, 23 and 33 are installed at each of the indoor units to circulate the room air for efficient heat exchange at the indoor heat exchangers 12, 22 and 32.

At each of the first, second and third refrigerant pipes, a measuring sensor (not illustrated) measuring the condition of the refrigerant pipe may be installed. The measuring sensors may be temperature sensors measuring the surface temperature of the refrigerant pipe, and may be connected with the control device (not illustrated) of the air conditioner. The control device of the air conditioner decides the operation condition of the indoor unit based on the data gauged at the temperature sensor.

A pressure sensor may be installed at the compressor. The pressure sensor measures the suction pressure of the compressor, and is connected with the control device of the air conditioner. The control device of the air conditioner decides the operation condition of the indoor unit with the data gauged at the pressure sensor. It is also possible that the operation condition of the indoor unit is decided by using both of the temperature sensor and the pressure sensor.

In the air conditioner configured as above, the refrigerant is cycled in the direction of the solid-lined arrow illustrated in FIG. 2 when the indoor units in the chambers A, B and C are operated with the cooling operation mode.

First, the refrigerant discharged from the compressor 41 of the outdoor unit 40 flows into the outdoor heat exchanger 43 through the 4-way valve 42. Then, the refrigerant flowing into the outdoor heat exchanger 43 is heat-exchanged with the outdoor air inflowing by the outdoor blowing fan.

After that, the refrigerant passed through the outdoor heat exchanger 43 flows into the expansion valves 10, and 30. Then, each of the expansion valves 10, 20 and 30 distributes the refrigerant into the operating indoor units in accordance with the operating condition, and intercepts the flow of the refrigerant into the indoor units that are not operating.

The refrigerant that flowed into the expansion valves 10, 20 and 30 flows into the indoor heat exchangers 12, 22 and 32 installed in the indoor units A, B and C. Then, the refrigerant that flowed into the indoor heat exchangers 12, 22 and 32 is heat-exchanged with the room air circulated by the inner blowing fans 13, 23 and 33.

After that, the refrigerant passed through the indoor heat exchangers 12, 22 and 32 flows back into the compressor 41 and is compressed by the compressor.

On the other hand, the refrigerant is cycled in the direction of the dotted-line arrow illustrated in FIG. 2 when the indoor units in the chambers A, B and C are operated under the heating operation mode.

First, the refrigerant discharged from the compressor installed at the outdoor unit 40 directly flows into the heat exchangers 12, 22 and 32 respectively installed in the indoor units A, B and C through the 4-way valve. Then, the refrigerant that flowed into the indoor heat exchanger 12, 22 and 32 is heat-exchanged with the room air flowed by the inner blowing fans 13, 23 and 33.

The refrigerant heat-exchanged at the indoor heat exchangers 12, 22 and 32 flows into the expansion valves 10, and 30 connected to each of the indoor units A, B and C, respectively. The expansion valves 10, 20 and 30 guide the refrigerant from the operating indoor units and intercept the flow of the refrigerant into the indoor units that are not operating.

The refrigerant passed through the expansion valves 10, 20 and 30 flows into the outdoor heat exchanger 43. Then, the refrigerant flowing into the outdoor heat exchanger 43 is heat-exchanged with the outdoor air flowed by the outdoor blowing fan 44.

After that, the refrigerant passed through the outdoor heat exchanger 43 flows back into the compressor 41 through the 4-way valve 42, and compressed again by the compressor. As above, the multi type air conditioner may perform both of the cooling operation and the heating operation.

The suction pressure of the compressor 41 becomes low if the cooling operation is continued for a predetermined time. If the suction pressure of the compressor becomes low, the surface temperature of the refrigerant pipe connecting the indoor units and the outdoor unit becomes low. Then, frost is formed, as the water-vapor in the air is condensed on the surface of the refrigerant pipe, and as the water-vapor in the air is frozen due to the lowering of the surface temperature of the refrigerant pipe.

It is concerned that the freezing on the surface of the refrigerant pipe may get more serious, since the heat exchange between the refrigerant and the air is deteriorated when water-vapor is frozen on the surface of the refrigerant pipe.

Therefore, the air conditioner operates the defrosting operation to thaw the frost formed on the surface of the refrigerant pipe. The defrost operation can be embodied through the heating operation to heat the indoor space.

The defrost operation can be initiated by the order of the users, and also can be automatically controlled by a control device of the air conditioner. For instance, the measuring sensor installed at the air conditioner gathers data related to the defrost operation, and the control device controls the air conditioner based on the data. The data related to the defrost operation of the air conditioner could be the temperature of the refrigerant pipe, the evaporating temperature or the compression temperature of the refrigerant.

Further, oil is circulated with the refrigerant while the air conditioner is operated under the cooling/heating operation mode. However, the compressor is operated with a lower compression capacity when a portion of the indoor units of a multi type air conditioner is operated, and it leads to the slower flowing velocity of the refrigerant. If the flowing velocity of the refrigerant becomes slower, the oil in the indoor unit doesn't inflow into the compressor. Then, an operation to recover the oil is required, as the required oil amount in the compressor becomes insufficient and the durability of the compressor becomes shortened.

The oil recovery operation is operated by controlling the operation ability of the compressor. For instance, the control device of the air conditioner checks the operating condition, such as the operation capacity of the indoor units and compressor being used and stopped condition of all of the indoor units and the entire operation capacity of the compressor. After that, the control device operates the air conditioner to recover the oil when the operation capacity of the compressor is smaller than a predetermined first set value and the operation time of the compressor is more than a first set time.

In the illustrated implementation, the control device recovers the oil into the compressor as controlling the operation capacity of the compressor for an optional time to reach the operation capacity of the compressor to a second set value to recover the oil.

An example of controlling the expansion valve will now be described in connection with one indoor unit C with reference to FIG. 3.

As described above, an outdoor heat exchanger 42 to heat exchange the refrigerant and outdoor air, and an expansion valve 30 to expand the refrigerant passed through the outdoor heat exchanger are installed at the air conditioner, as illustrated in FIG. 2.

Further, an indoor heat exchanger 32 heat exchanges the refrigerant passed through the expansion valve 30 with room air. The refrigerant discharged from the outdoor heat exchanger flows into the expansion valve 30 through the main refrigerant pipe 45, and the refrigerant passed through the expansion valve 30 flows into the indoor heat exchanger through the third refrigerant pipe 53, as illustrated in FIG. 2.

Figure 3:
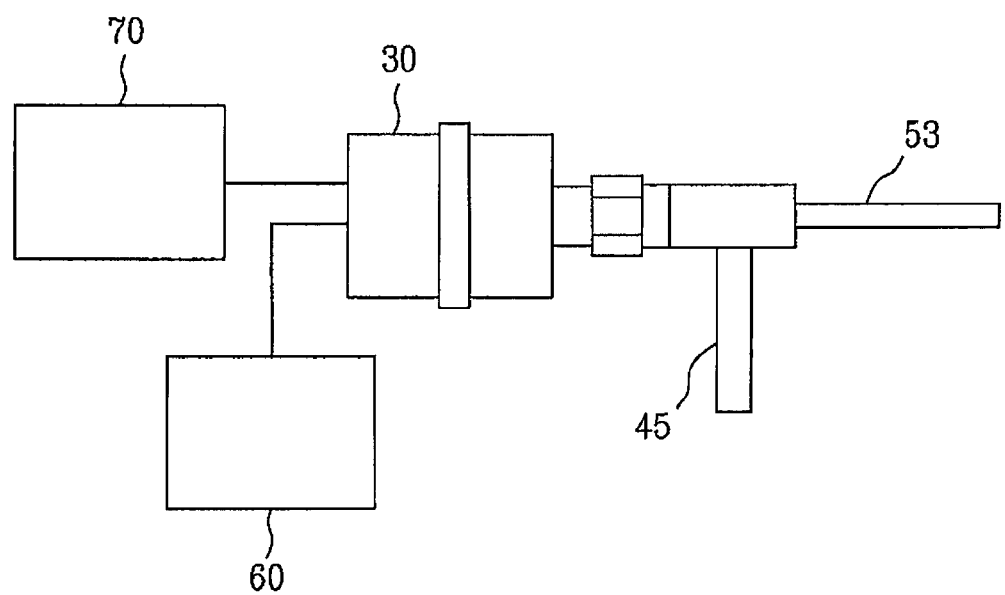
FIG. 3 is a schematic diagram of the expansion valve control mechanism.

Referring to FIG. 3, a signal generation device 60 generating control signals is connected to the expansion valve 30 to control the opening speed of the expansion valve. Furthermore, a control device 70 controlling the opening speed of the expansion valve based on the signals generated from the signal generation device is connected to the expansion valve 30.

A solenoid valve can be used for the expansion valve 30. Therefore, it is possible for the expansion valve to be remotely controlled by electronic signals, and to be controlled minutely through the electronic signals. In the illustrated implementation, the opening speed of the expansion valve 30 is controlled in accordance with the control signals applied from the signal generation device 60. Here, a pulse type signal is used for the control signals generated at the signal generation device 60.

The expansion valve may comprise a stepping motor and a needle valve. Therefore, the pulse type control signal applied to the stepping motor controls the opening speed of the expansion valve.

The flow amount of the refrigerant flowing through the refrigerant pipe can be changed by controlling the opening speed of the expansion valve. For instance, when the opening speed of the expansion valve becomes fast, the flowing amount of the refrigerant becomes increased. Also, the flowing noise due to the flow of refrigerant is generally increased when the flowing amount of the refrigerant is increased.

Furthermore, the flowing pattern of the refrigerant flowing through the refrigerant pipe is also changed when the opening speed of the expansion valve is changed. The refrigerant passing through the outdoor heat exchanger is a mixture of liquid refrigerant and gaseous refrigerant. That is, there are bubbles in the liquid refrigerant.

Therefore, the flowing speed and flowing pressure of the refrigerant are changed when the opening speed of the expansion valve is changed, and it leads to the change of the flowing of the bubbles. The bubbles in the refrigerant collide against each other when the opening speed of the expansion valve becomes fast, and it leads to the increase of flowing noise of the refrigerant.

Figure 4:
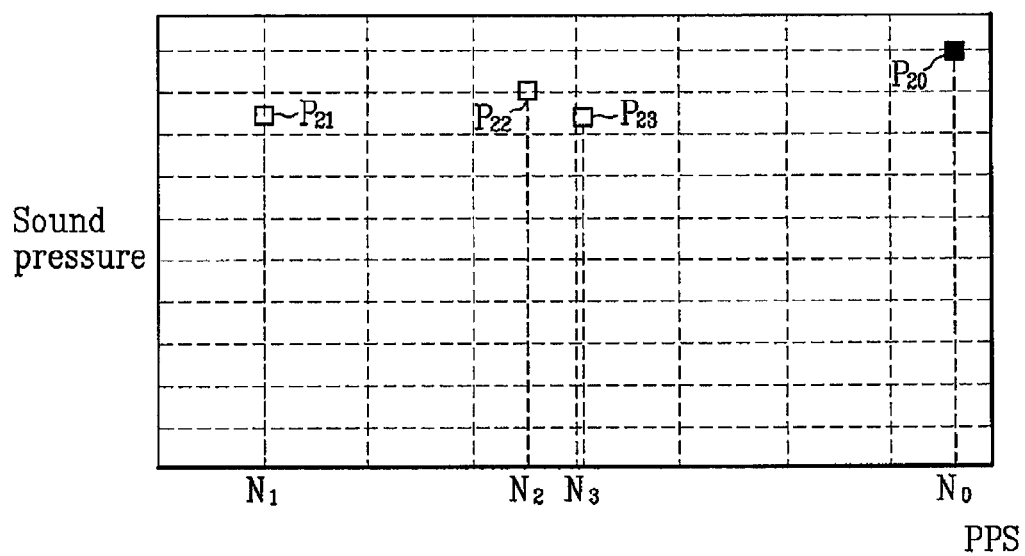
FIG. 4 is a graph indicating the noise generated from an air conditioner of FIGS. 2 and 3.

FIG. 4 shows the sound pressure level (dB) of noise generated at the air conditioner at various opening speeds of the expansion valve, as represented by the pulse per second (PPS) of the controlling signal applied to the expansion valve.

When the expansion valve of the air conditioner is opened, flowing noise is generated due to the flow of refrigerant. At this time, an over shoot area of sound pressure level is generated.

Here, the point P20 corresponds to the sound pressure level of noise generated at the opening speed of the expansion valve of a conventional air conditioner. Further, points P21, P22 and P23 correspond to the sound pressure levels of noise generated at reduced opening speeds of the expansion valve according to one implementation of the air conditioner described herein.

The control signals having a frequency of 166 PPS, as represented by N0 in FIG. 4, are regularly applied to the expansion valve of the conventional air conditioner, and control signals having a frequency between 100 PPS and 140 PPS, as represented by N1, N2 and N3, are applied to the expansion valve of the air conditioner according to one implementation of the air conditioner described herein.

The opening speed of the expansion valve is obtained experimentally to be suitable for the refrigerant recovery operation mode and corresponding control signals are applied to the expansion valve during the refrigerant recovery operation mode.

When the control signals of 100 PPS to 140 PPS are applied during the oil recovery operation mode, maximum 5 dB of flowing noise at the area of overshooting is reduced, compared to the flowing noise of the conventional air conditioner.

Figure 5:
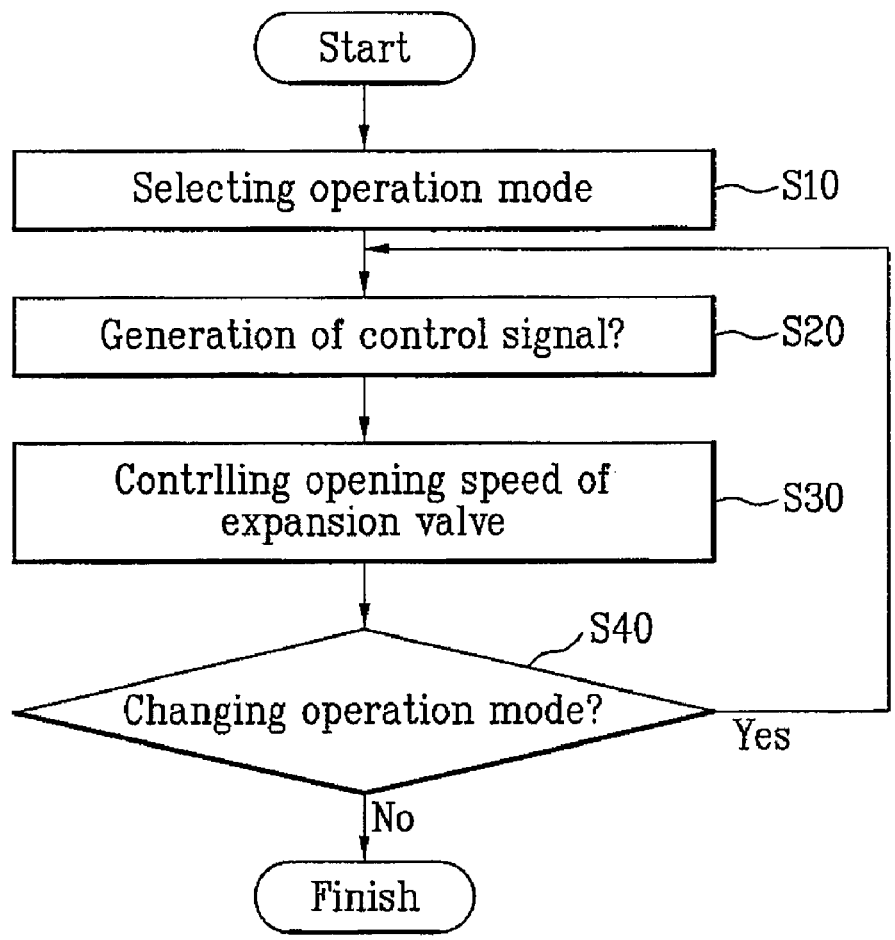
FIG. 5 is a flow chart illustrating the control method of an air conditioner.

FIG. 5 is a flow chart illustrating the control method of an air conditioner. First, the operation mode of the air conditioner is decided by a user or the control device of the air conditioner at S10. In the illustrated implementation, the user can select one operation mode among the cooling/heating operation mode to cool and heat the indoor space, the defrost operation mode to remove frost generated due to the operation of the indoor unit, and the oil recovery operation mode to recover the oil circulated during the operation of the indoor unit.

Alternatively, it is possible for the control device of the air conditioner to select the operation mode, even though the user doesn't select the operation mode of the air conditioner directly. For instance, a sensor gauging the amount of circulated oil or a sensor gauging the temperature around the indoor heat exchanger may be arranged at the air conditioner. Then, the control device compares the data gauged at the sensors with the data of a normal air conditioner related to the defrost operation and oil recovery operation, and decides the operation mode of the air conditioner with basis of the comparison.

Then, the signal generation device generates the established control signals in accordance with the selected operation mode of the air conditioner at S20. The control signals generated from the signal generation device are previously saved in the signal generation device.

At step S30, the control device controls the opening speed of the expansion valve with basis of the control signals. That is, the opening speed of the expansion valve is controlled differently in accordance with the operation modes of the air conditioner. For instance, the opening speed of the expansion valve during the cooling/heating operation mode of the air conditioner may be established faster than the opening speed of the expansion valve during the defrost operation mode or oil recovery operation mode.

The control device can also control the opening speed of the expansion valve variously during a single operation mode. For instance, the control device opens the expansion valve with a first opening velocity during a first established period from the start of opening the expansion valve, and opens the expansion valve with a second opening velocity during a second established period after passing the first established period. The control device can open the expansion valve with an opening velocity changed instantly over the entire corresponding operation mode.

If an operation mode of the air conditioner is using is changed into another operation mode at S40, the control device closes the current operation mode, and operates the air conditioner with the selected operation mode. Of course, the control device can change the operation mode automatically when a time previously saved in the control device, a predetermined set time, is passed from the start of opening the expansion valve. After that, the opening speed of the expansion valve is controlled again in accordance with the changed operation mode.

As explained, the air conditioner and the control method thereof can reduce the flowing noise of the refrigerant by controlling the opening speed of the expansion valve differently in accordance with the operation modes of the indoor unit.

Accordingly, certain implementations of the described air conditioner and the control method thereof can reduce the manufacturing costs, as noise reducing devices to reduce the flowing noise such as a muffler and a strainer do not have to be installed. Also, since the flowing noise harsh to the human ears is reduced, the dissatisfactions of the consumers are settled and the reliance of the products is increased.

Other implementations are within the scope of the following claims.

What is claimed is:

1. An air conditioner comprising:
an outdoor unit having an outdoor heat exchanger for heat exchange between outdoor air and a refrigerant, and a compressor for compressing the refrigerant;
at least one indoor unit, each indoor unit having an indoor heat exchanger for heat exchange between indoor air and the refrigerant;
at least one refrigerant pipe, each refrigerant pipe corresponding to a single indoor heat exchanger of an indoor unit, and connecting the outdoor heat exchanger to the corresponding indoor heat exchanger;
an expansion valve provided on each refrigerant pipe for the expansion of the refrigerant;
a temperature sensor provided on each refrigerant pipe;
a pressure sensor provided at the compressor; and a control device configured to:
  determine an operating condition of the air conditioner by comparing data gauged at the pressure and temperature sensors with data representative of threshold air conditioner operating conditions,
  select an operation mode of the air conditioner on the basis of the determination, the operation modes including a cooling/heating mode to cool and heat indoor air, an oil recovery mode to recover oil circulated during other operation modes, and a defrost mode to remove frost generated during other operation modes, and
  control the opening speed of the expansion valves according to the selected operation mode, the opening speed of the expansion valves when the cooling/heating operation mode is selected being faster than the opening speed of the expansion valves when the oil recovery operation mode or the defrost operation mode is selected,
wherein, when the oil recovery operation mode is selected, the control device operates the air conditioner to recover oil into the compressor, changing the operation capacity of the compressor.

2. The air conditioner of claim 1 further comprising at least two indoor units, wherein the control device is further configured to determine the operating condition of the air conditioner by comparing data gauged at the pressure and temperature sensors with data representative of threshold air conditioner operating conditions.

3. The air conditioner of claim 2, wherein the control device is further configured to select an operation mode of each of the indoor units, each of the indoor units operating independently of each of the other indoor units such that the selected operation modes may differ between different indoor units.

4. The air conditioner of claim 3, wherein the control device is further configured to control the opening speed of each expansion valve according to the operation mode selected for its corresponding indoor unit.

5. The air conditioner of claim 3, wherein the control device is further configured to stop the operation of individual indoor units, and wherein each expansion valve is further configured to intercept the flow of the refrigerant into its corresponding indoor unit if the corresponding indoor unit is not operating.

6. The air conditioner of claim 1, further comprising:
a signal generation device configured to generate established control signals corresponding to the selected operation mode, the established control signals being stored in the signal generation device, the control device controlling the opening speeds of the expansion valves in accordance with the generated control signals.

7. The air conditioner of claim 1, wherein the control device is further configured to vary the opening speeds of the expansion valves during the execution of a single operation mode.

8. The air conditioner of claim 1, wherein the expansion valves are configured to operate with a pulse per second of 100 PPS to 140 PPS during the oil recovery operation mode.

9. The air conditioner of claim 1, wherein the control device is further configured to control the opening degrees of the expansion valves according to the selected operation mode, the opening degrees of the expansion valves differing between different operation modes.

10. The air conditioner of claim 1, wherein the control device is further configured to determine the operating condition of the air conditioner by gauging the operating capacity of each of the indoor units and by gauging the operating capacity of the compressor.

11. The air conditioner of claim 1, wherein:
each temperature sensor is configured to measure the surface temperature of its corresponding refrigerant pipe, and
the pressure sensor is configured to measure the suction pressure of the compressor.

12. The air conditioner of claim 1, wherein refrigerant passed through the outdoor heat exchanger flows into one or more of the expansion valves, and wherein each of the one or more expansion valves distributes refrigerant into its corresponding indoor unit in accordance with the operating condition of the corresponding indoor unit.

13. A control method of an air conditioner, the method comprising:
determining the operating condition of an indoor unit by comparing pressure data gauged by a sensor located at the compressor and temperature data gauged by a sensor located at a position corresponding to the indoor unit with data representative of threshold air conditioner operating conditions;
selecting an operation mode of the indoor unit on the basis of the determination, the operation modes of the indoor unit including a cooling/heating operation mode, an oil recovery operation mode, and a defrost operation mode; and
controlling an opening speed of an expansion valve for refrigerant in accordance with the selected operation mode, the opening speed of the expansion valve when the cooling/heating operation mode is selected being faster than the opening speed of the expansion valve when the oil recovery mode or defrost mode is selected.

14. The control method of claim 13 further comprising generating established control signals corresponding to the selected operation mode to control the opening speed of the expansion valve.

15. The control method of claim 13, wherein the opening speed of the expansion valve varies during the execution of a single operation mode.

16. The control method of claim 13, wherein determining the operating condition of the indoor unit further comprises gauging the amount of circulated oil.

17. The control method of claim 13 further comprising redetermining the operating condition of the indoor unit after a set period of time and selecting an operation mode on the basis of the redetermination.

18. An air conditioner comprising:
an outdoor unit having an outdoor heat exchanger for heat exchange between outdoor air and a refrigerant, and a compressor for compressing the refrigerant;
at least one indoor unit, each indoor unit having an indoor heat exchanger for heat exchange between indoor air and the refrigerant;
at least one refrigerant pipe, each refrigerant pipe corresponding to a single indoor heat exchanger of an indoor unit, and connecting the outdoor heat exchanger to the corresponding indoor heat exchanger;
an expansion valve provided on each refrigerant pipe for the expansion of the refrigerant;
at least one temperature sensor, each temperature sensor corresponding to a single indoor unit;
a pressure sensor;
a means for determining the operating condition of an indoor unit by comparing pressure data gauged by the pressure sensor and temperature data gauged by each temperature sensor with data representative of threshold air conditioner operating conditions;

a means for selecting an operation mode of the indoor unit on the basis of the determination; and a means for controlling an opening speed of an expansion valve for refrigerant in accordance with the selected operation mode, the opening speed of the expansion valve when a first operation mode is selected being faster than the opening speed of the expansion valve when a second operation mode is selected.

* * * * *